US011383658B2

(12) United States Patent
Takakura et al.

(10) Patent No.: US 11,383,658 B2
(45) Date of Patent: Jul. 12, 2022

(54) SUPPORTING MEMBER AND WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Ryuta Takakura, Mie (JP); Tetsuya Nishimura, Mie (JP); Syo Shiratori, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 146 days.

(21) Appl. No.: 16/621,907

(22) PCT Filed: Oct. 30, 2018

(86) PCT No.: PCT/JP2018/040217
§ 371 (c)(1),
(2) Date: Dec. 12, 2019

(87) PCT Pub. No.: WO2020/089988
PCT Pub. Date: May 7, 2020

(65) Prior Publication Data
US 2021/0197740 A1 Jul. 1, 2021

(51) Int. Cl.
*F16L 3/00* (2006.01)
*B60R 16/02* (2006.01)
*H02G 3/06* (2006.01)
*H02G 3/00* (2006.01)

(52) U.S. Cl.
CPC ....... *B60R 16/0215* (2013.01); *H02G 3/0608* (2013.01); *H02G 3/263* (2013.01)

(58) Field of Classification Search
None
See application file for complete search history.

(56) References Cited

U.S. PATENT DOCUMENTS

2005/0242245 A1* 11/2005 Balderama ............. F16L 3/243 248/65
2012/0217372 A1 8/2012 Vauchel et al.
(Continued)

FOREIGN PATENT DOCUMENTS

CN 101304166 11/2008
CN 102255184 11/2011
(Continued)

OTHER PUBLICATIONS

International Preliminary Report on Patentability received in PCT/JP2018/040217, dated Apr. 27, 2021 and English anguage translation thereof.

(Continued)

*Primary Examiner* — Steven M Marsh
(74) *Attorney, Agent, or Firm* — Greenblum & Bernstein, P.L.C.

(57) ABSTRACT

A supporting member is a supporting member for attaching a plurality of electrical wires to an attaching target member. The supporting member includes a plurality of electrical wire holding members each including an electrical wire holding part which can hold at least a part of an electrical wire and a connection part integrally formed with the electrical wire holding part. The plurality of electrical wire holding members are parallelly connected by the connection parts so that the plurality of electrical wires to be held by the electrical wire holding parts are parallel to each other.

9 Claims, 8 Drawing Sheets

(56) References Cited

U.S. PATENT DOCUMENTS

| | | | | |
|---|---|---|---|---|
| 2013/0092434 | A1* | 4/2013 | Kato | H02G 3/0406 174/72 A |
| 2014/0283480 | A1 | 9/2014 | Zhang et al. | |
| 2014/0345245 | A1 | 11/2014 | Borch-Jensen et al. | |
| 2016/0240963 | A1 | 8/2016 | Kitamura et al. | |
| 2016/0261232 | A1* | 9/2016 | Grushkowitz | F16M 11/18 |
| 2017/0104318 | A1 | 4/2017 | Uno | |
| 2017/0148542 | A1 | 5/2017 | Maeda | |
| 2018/0331523 | A1* | 11/2018 | Ruebel | H02G 3/0437 |
| 2019/0305531 | A1* | 10/2019 | Fujimura | H02G 3/03 |
| 2020/0108783 | A1* | 4/2020 | Enomoto | B60R 16/0215 |
| 2021/0062938 | A1* | 3/2021 | Storm | F16L 3/085 |
| 2021/0188199 | A1* | 6/2021 | Takakura | H02G 3/30 |

FOREIGN PATENT DOCUMENTS

| | | |
|---|---|---|
| CN | 102596721 | 7/2012 |
| CN | 103155324 | 6/2013 |
| CN | 104081602 | 10/2014 |
| CN | 105637718 | 6/2016 |
| CN | 107017601 | 8/2017 |
| CN | 107039945 | 8/2017 |
| JP | 2002-176716 A | 6/2002 |
| JP | 2007-76576 A | 3/2007 |
| JP | 2015-46991 A | 3/2015 |
| JP | 2016-171678 A | 9/2016 |
| JP | 2017-212776 | 11/2017 |

OTHER PUBLICATIONS

Indian Office Action issued in Application No. 201917051563, dated Sep. 1, 2020.

Chinese Official Action issued in CN. Application No. 201880038101.4, dated Jan. 5, 2021 and English language translation thereof.

Official Communication issued in Patent Application No. PCT/JP2018/040217, dated Dec. 11, 2018.

* cited by examiner

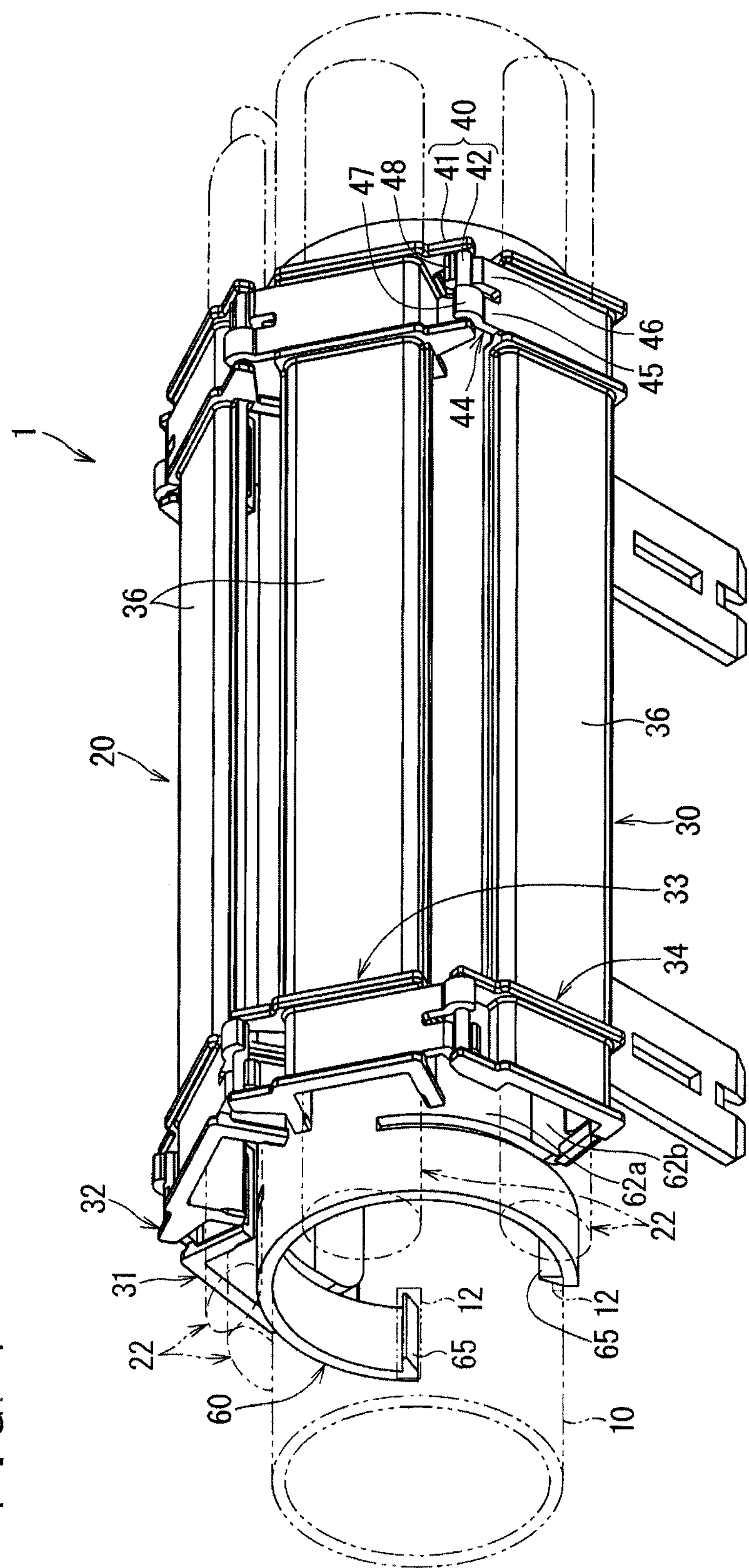
F I G. 1

F I G. 4
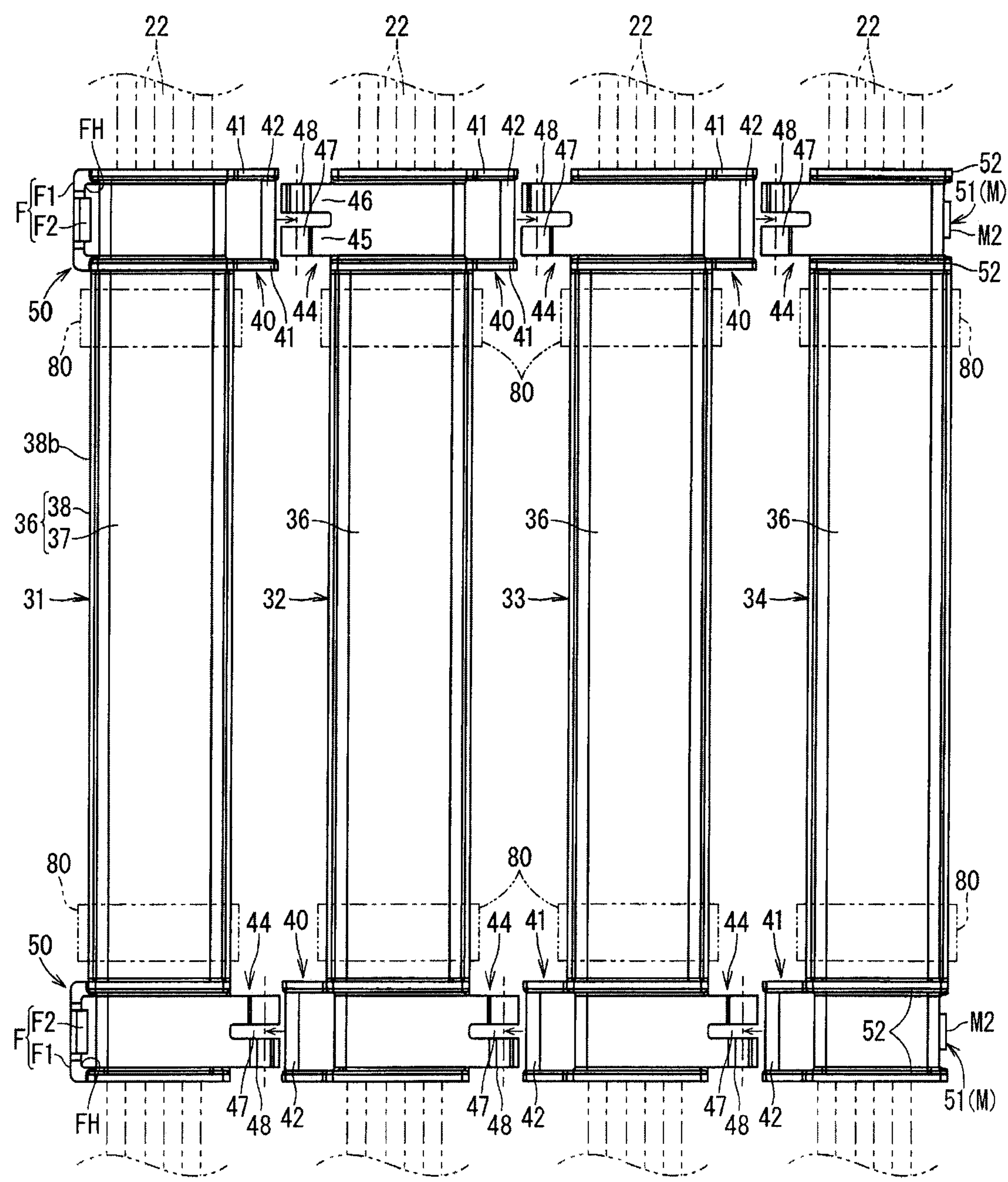

F I G. 7
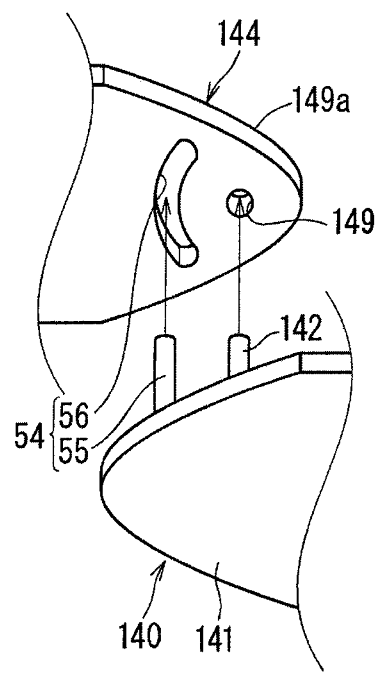
F I G. 8
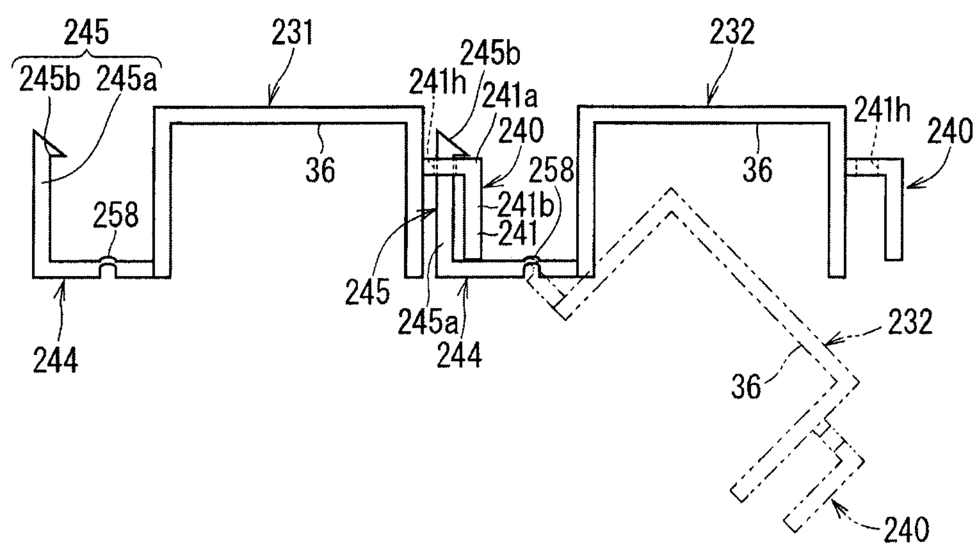

SUPPORTING MEMBER AND WIRING MEMBER

TECHNICAL FIELD

The present invention relates to a technique of supporting a wiring member around an attaching target member.

BACKGROUND ART

Patent Document 1 discloses a technique of arranging electrical wires along a rod-like fixing member such as a reinforcement. In Patent Document 1, the electrical wires are disposed on a protection member surrounding the rod-like fixing member.

PRIOR ART DOCUMENTS

Patent Documents

Patent Document 1: Japanese Patent Application Laid-Open No. 2016-171678

SUMMARY

Problem to be Solved by the Invention

However, in Patent Document 1, a bundle of a plurality of electrical wires is disposed along the rod-like fixing member.

An object of the present invention is to provide a technique capable of separately attaching a plurality of electrical wires to an attaching target member.

Means to Solve the Problem

In order to solve the above problem, a supporting member according to a first aspect is a supporting member for attaching a plurality of electrical wires to an attaching target member, including: a plurality of electrical wire holding members each including an electrical wire holding part which can hold at least a part of an electrical wire and a connection part integrally formed with the electrical wire holding part, wherein the plurality of electrical wire holding members are parallelly connected by the connection parts so that the plurality of electrical wires to be held by the electrical wire holding part are parallel to each other.

The supporting member according to a second aspect is the supporting member according to the first aspect, wherein first and second electrical wire holding members in the plurality of electrical wire holding members mutually connected are rotatable at least between a state of being flatly arranged and a state of being arranged along an outer periphery of the attaching target member.

The supporting member according to a third aspect is the supporting member according to the second aspect, wherein the first electrical wire holding member has a shaft as the connection part, and the second electrical wire holding member has a bearing rotatably supporting the shaft as the connection part.

The supporting member according to a fourth aspect is the supporting member according to the second aspect, wherein at least one of the first and second electrical wire holding members further includes a hinge part integrally formed with the connection part and the electrical wire holding part so as to intervene between the connection part and the electrical wire holding part and rotatably connecting the connection part and the electrical wire holding part.

The supporting member according to a fifth aspect is the supporting member according to the second aspect, wherein the first electrical wire holding member includes a locked part in which a hole is formed as the connection part, the second electrical wire holding member includes a locking part having a column passing through the hole and a locking piece locked to a peripheral edge part of the hole as the connection part, and the hole is formed larger than the column, thus the first and second electrical wire holding members are rotatably connected.

The supporting member according to a sixth aspect is the supporting member according to any one of the second to fifth aspects, wherein a rotation amount control part controlling a rotation amount of the first and second electrical wire holding members is provided.

The supporting member according to a seventh aspect is the supporting member according to any one of the first to sixth aspects, further including a base attached to the attaching target member in a state of surrounding at least a part of a periphery of the attaching target member and having an outer periphery to which each of the electrical wire holding members is attached, wherein at least one of the plurality of electrical wire holding members further includes a base attaching part attached to an attached part formed on the base.

The supporting member according to an eighth aspect is the supporting member according to the seventh aspect, wherein three or more of the plurality of electrical wire holding members are connected and arranged along an outer periphery of the base, and the base attaching part is provided only on electrical wire holding members located on both ends of the three or more of the plurality of electrical wire holding members which are connected.

The supporting member according to a ninth aspect is the supporting member according to the seventh or eighth aspect, wherein the base includes, as the attached part, a first attached part to which each of the plurality of electrical wire holding members holding electrical wires provided in common is attached and a second attached part to which each of the plurality of electrical wire holding members holding electrical wires optionally provided is attached.

A wiring member according to a tenth aspect includes the supporting member according to any one of the first to ninth aspects and a plurality of electrical wires separately held by the plurality of electrical wire holding members.

Effects of the Invention

According to each embodiment, the plurality of electrical wire holding members in the supporting member can separately hold the plurality of electrical wires. This supporting member is attached to the attaching target member, thus the plurality of electrical wires can be attached separately to the attaching target member.

According to the second aspect, even when the plurality of electrical wire holding members are connected, the plurality of electrical wire holding members can be arranged along the outer periphery of the attaching target member, thus the height of the wiring member from the attaching target member can be reduced. After the operation of housing the electrical wires in the plurality of electrical wire holding members in the state where the plurality of electrical wire holding members are flatly arranged, the plurality of electrical wire holding members can be rotated to surround the periphery of the attaching target member. Accordingly, the operation of housing the electrical wires in the plurality of electrical wire holding parts can be easily performed.

According to the third aspect, the electrical wire holding members are rotatable at the connection part.

According to the fourth aspect, the electrical wire holding members are rotatable at the hinge part provided separately from the connection part.

According to the fifth aspect, the electrical wire holding members are rotatable at the connection part.

According to the sixth aspect, the excess rotation of the electrical wire holding members can be suppressed.

According to the seventh aspect, the plurality of electrical wire holding members are attached to the base, thereby being kept in the state of being arranged along the periphery of the attaching target member. Accordingly, the wiring member can be easily attached to the attaching target member.

According to the eighth aspect, the electrical wire holding members located in the middle position need not be provided with the base attaching part.

According to the ninth aspect, the electrical wires provided in common and the electrical wires optionally provided can be easily supported separately. Accordingly, the present configuration can easily correspond to a design change, for example.

BRIEF DESCRIPTION OF DRAWINGS

FIG. 1 A perspective view illustrating a support structure of a wiring member according to an embodiment.

FIG. 4 An exploded plan view illustrating an electrical wire holding member.

FIG. 7 A perspective view illustrating a first modification example of a connection structure of the electrical wire holding members.

FIG. 8 A front view illustrating a second modification example of a connection structure of the electrical wire holding members.

DESCRIPTION OF EMBODIMENT(S)

Embodiment

A supporting member according to an embodiment and a wiring member including the supporting member are described hereinafter. Described herein is an example of a support structure of a wiring member in which a wiring member is attached to an attaching target member.

Figure 2:
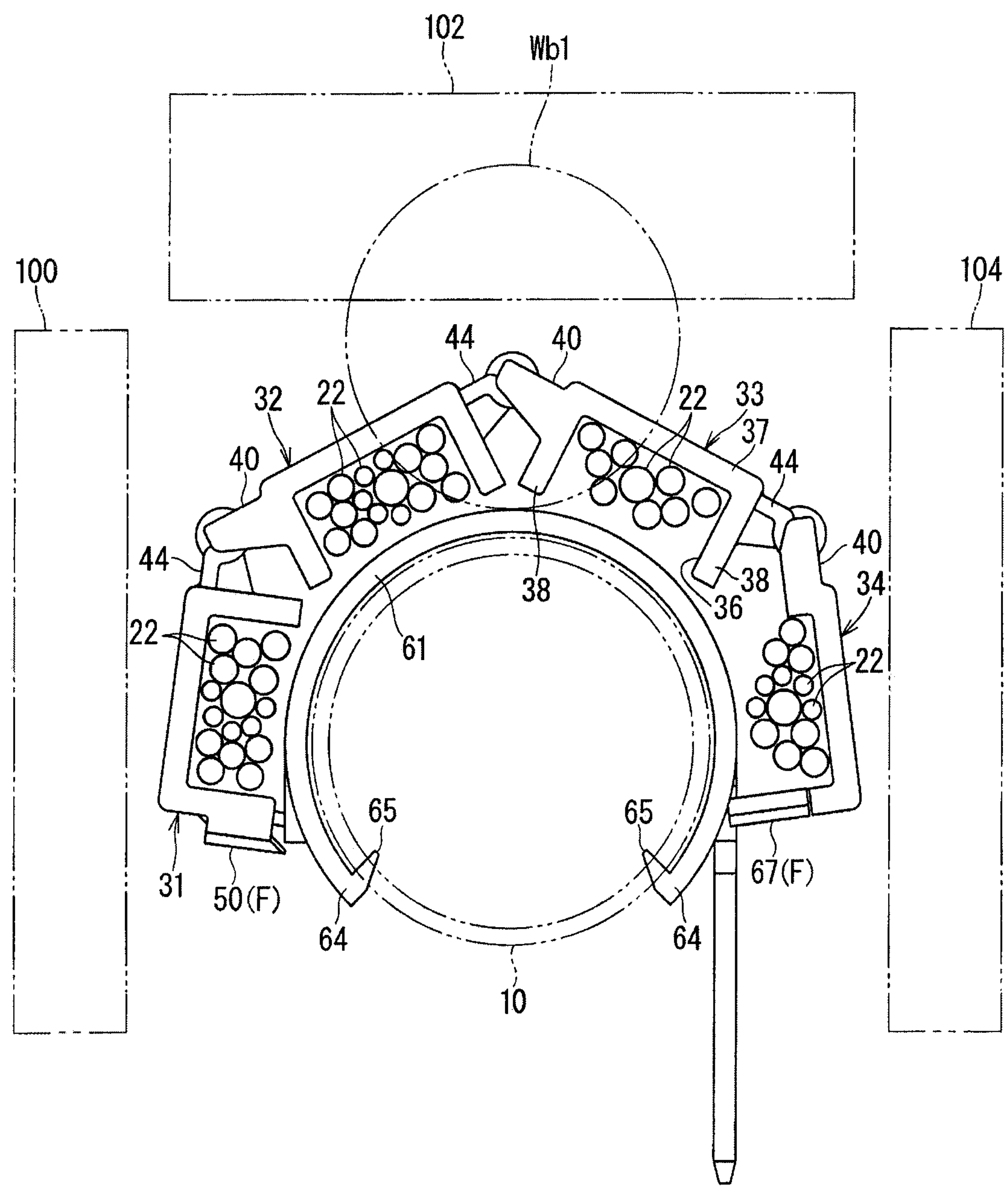
FIG. 2 A front view illustrating the support structure of the wiring member according to the embodiment.
Figure 3:
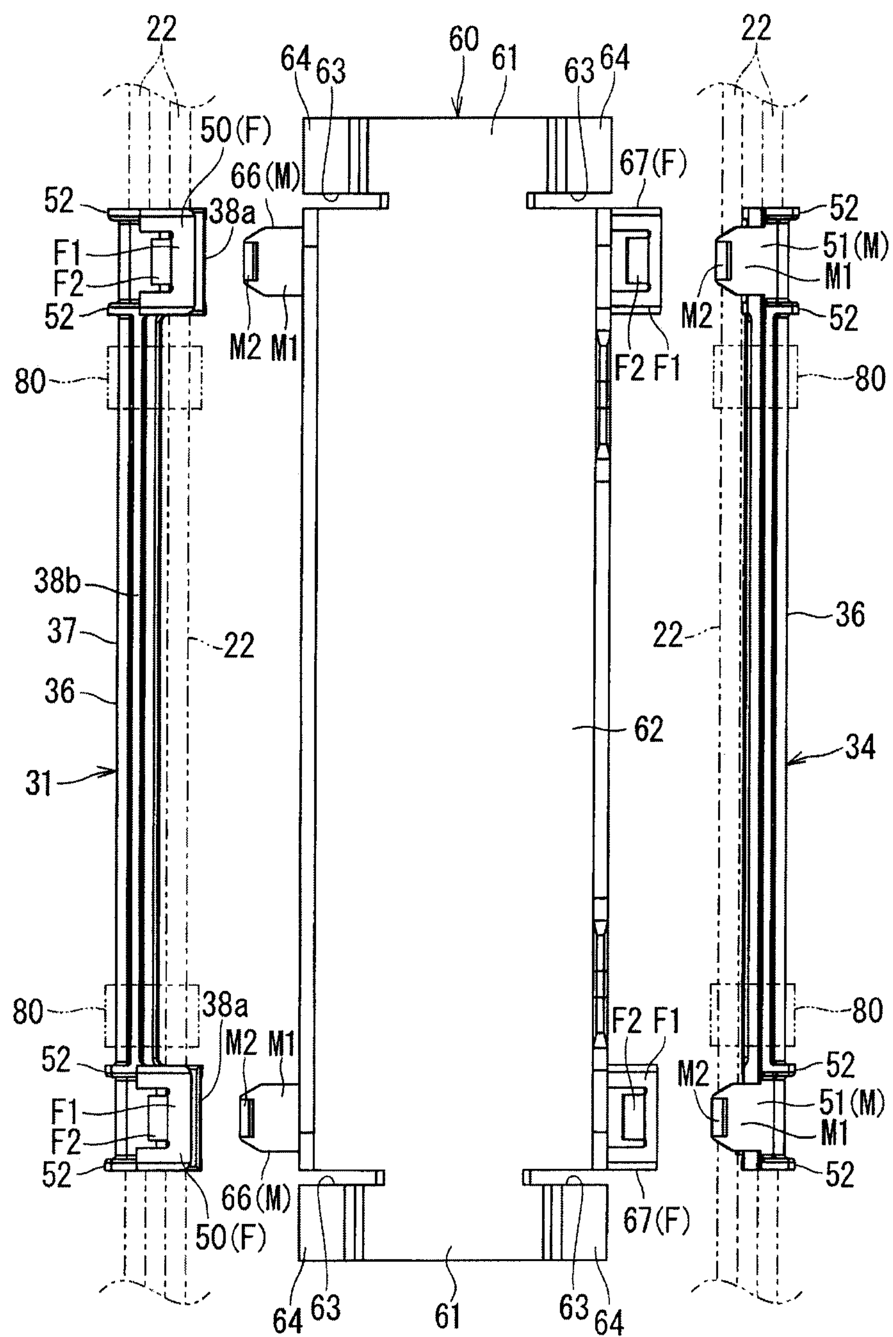
FIG. 3 An exploded bottom view of a supporting member.
Figure 5:
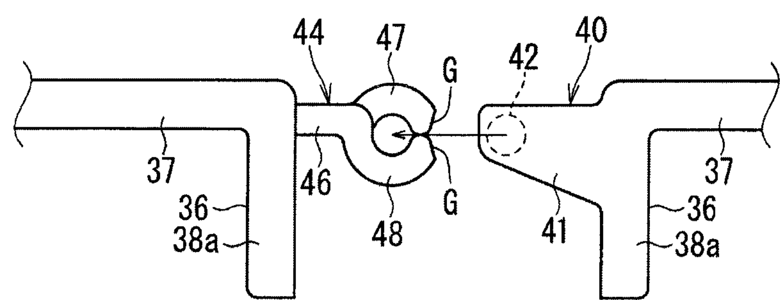
FIG. 5 An explanation drawing illustrating a connection of the electrical wire holding members.
Figure 6:
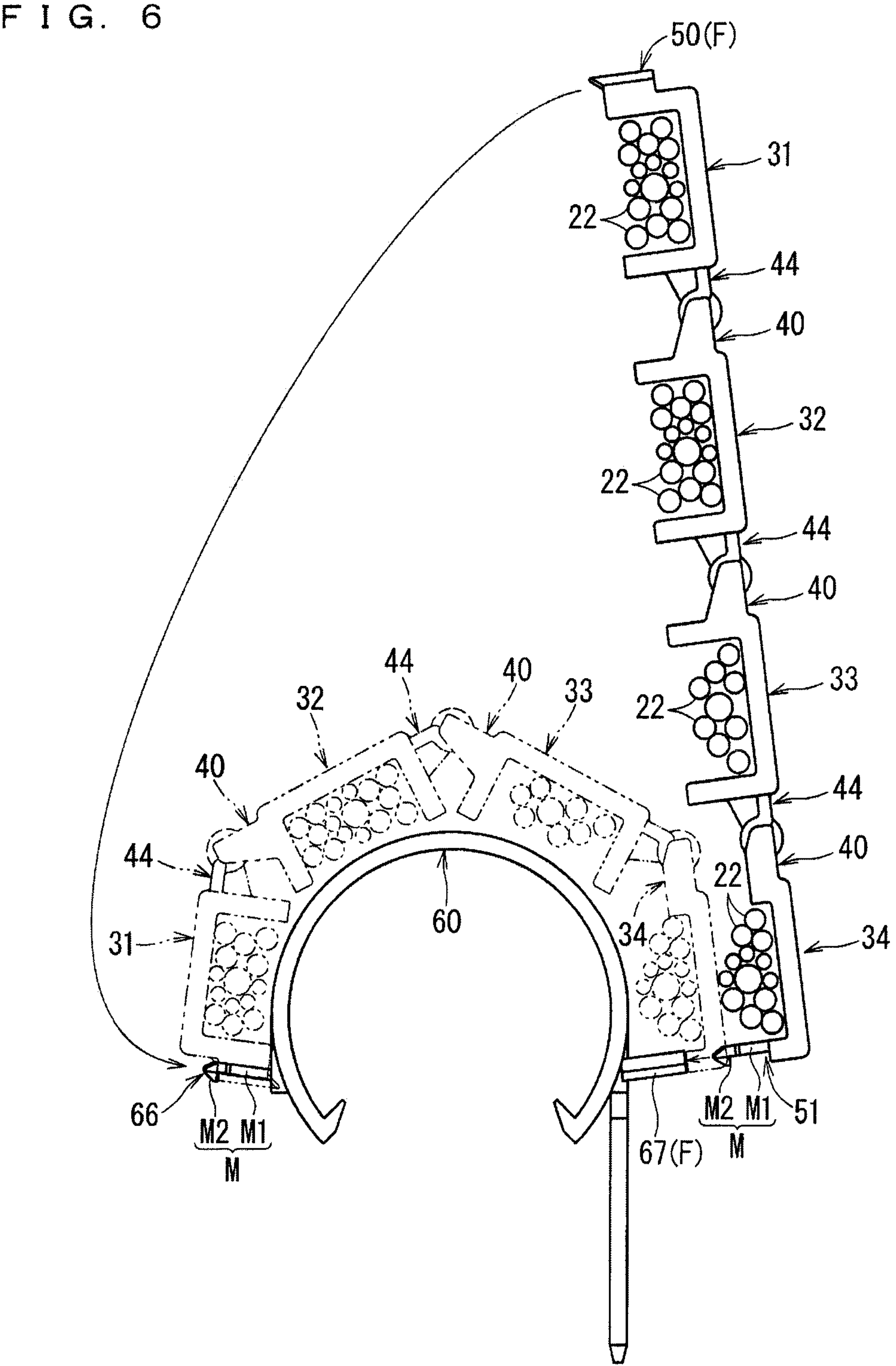
FIG. 6 An explanation drawing illustrating the electrical wire holding members attached to a base.

FIG. 1 is a perspective view illustrating a support structure 1 of a wiring member according to the embodiment. FIG. 2 is a front view illustrating the support structure 1 of the wiring member according to the embodiment. FIG. 3 is an exploded bottom view of a supporting member 30. FIG. 4 is an exploded plan view illustrating electrical wire holding members 31, 32, 33, and 34. FIG. 5 is an explanation drawing illustrating a connection of the electrical wire holding members 31, 32, 33, and 34. FIG. 6 is an explanation drawing illustrating the electrical wire holding members 31, 32, 33, and 34 attached to a base 60.

The support structure 1 of the wiring member includes an attaching target member 10 and the wiring member 20. The wiring member 20 includes a plurality of electrical wires 22 and the supporting member 30. The support structure 1 of the wiring member is a structure for supporting the supporting member 30 which holds the electrical wires 22 on the attaching target member 10 That is to say, in a case where the electrical wires 22 are disposed along the attaching target member 10, the supporting member 30 fixed to the attaching target member 10 supports the electrical wires 22 along the attaching target member 10.

The attaching target member 10 described above is assumed to be a reinforcement and a vehicle body frame, for example. The reinforcement is a reinforcement member of a vehicle body, and is normally formed in a rod-like shape. The reinforcement is disposed along a width direction of a vehicle in an installment panel located in front of a driver seat and a front passenger seat in the vehicle, for example. When the electrical wires 22 for an electrical device disposed in the installment panel are disposed in the installment panel, the electrical wires 22 are disposed along the reinforcement. The support structure 1 of the wiring member described above can be applied as a structure of supporting the electrical wires 22 along the reinforcement in such a case. Obviously, the support structure 1 of the wiring member can also be applied as a structure of supporting the electrical wires 22 on the other vehicle body frame such as a portion where an elongated protruding portion is formed on a part of a metal body, for example.

Described herein is that the attaching target member 10 is a rod-like member, more specifically, a cylindrical member. A fixing hole 12 is formed in the attaching target member 10 to hold the supporting member 30 in a predetermined position. Herein, the fixing holes 12 are formed in two positions at both sides of a central axis of the attaching target member 10 in a middle part of the attaching target member 10 in a longitudinal direction. A locking claw 65 for positioning the supporting member 30, which is described below, is fitted into the fixing hole 12, thus the supporting member 30 is supported in a predetermined position in an extension direction and a circumferential direction of the supporting member 30 in a state of not getting out of the attaching target member 10.

The electrical wires 22 are insulated electrical wires each including a core wire and an insulating covering for covering the core wire. The core wire is made of a conductive material such as copper or aluminum. The core wire may be a single wire or a twisted wire. The insulating covering is formed by extrusion molding, for example, a resin around the core wire.

The plurality of electrical wires 22 gather around the attaching target member 10 in a portion where the plurality of electrical wires 22 disposed along the attaching target member 10. The plurality of electrical wires 22 may be branched toward outside in a portion where the plurality of electrical wires 22 extend from an end portion of the attaching target member 10 and a portion where the plurality of electrical wires 22 are disposed along the attaching target member 10 as necessary. The plurality of electrical wires 22 may be connected to an electrical device such as an electronic control unit, a load, and a sensor via a connector, for example, at each branch destination.

The plurality of electrical wires 22 are divided into a plurality of groups in a portion where the plurality of electrical wires 22 are disposed along the attaching target member 10. The grouping of the electrical wires 22 of each group may be performed for each branch, but is not necessary.

The electrical wires 22 of each group are separately held in the supporting member 30, however, in the other portion, the plurality of electrical wires 22 included in each group may be held in one bundle. When the plurality of supporting members 30 are provided, the grouping of the electrical wires 22 held in each supporting member 30 may be or may not be the same.

Described herein is an example that the plurality of electrical wires 22 are divided into four groups in a portion where the plurality of electrical wires 22 are supported in the supporting member 30.

The supporting member 30 includes the plurality of electrical wire holding members 31, 32, 33, and 34 separately holding the plurality of electrical wires 22. Herein, the supporting member 30 further includes the base 60 to which the electrical wire holding members 31, 32, 33, and 34 are attached.

Each of the electrical wire holding members 31, 32, 33, and 34 includes an electrical wire holding part 36. Herein, the electrical wire holding member 31 further includes connection parts 40 and 44 and a base attaching part 50, the electrical wire holding members 32 and 33 further include connection parts 40 and 44, and the electrical wire holding member 34 further includes connection parts 40 and 44 and a base attaching part 51. The electrical wire holding members 32 and 33 are formed into a similar shape. The electrical wire holding member 31 is a molded component integrally molded, using a resin, for example, to include the electrical wire holding part 36, the connection parts 40 and 44, and the base attaching part 50. In the similar manner, each of the electrical wire holding members 32, 33, and 34 is a molded component integrally molded, using a resin, so that the electrical wire holding members 32 and 33 include the electrical wire holding part 36 and the connection parts 40 and 44 and the electrical wire holding member 34 includes the electrical wire holding part 36, the connection parts 40 and 44, and the base attaching part 51.

The electrical wire holding member 36 holds one of the groups into which the plurality of electrical wires 22 are divided. Herein, each of the electrical wire holding members 31, 32, 33, and 34 is provided with one electrical wire holding part 36. However, each of the electrical wire holding members 31, 32, 33, and 34 may be provided with the plurality of electrical wire holding parts 36. That is to say, each of the electrical wire holding members 31, 32, 33, and 34 may hold the plurality of divided groups in the plurality of electrical wires 22.

The electrical wire holding part 36 is formed in a gutter shape including a first plate part 37 and second plate parts 38 standing on both sides of the first plate part 37. The electrical wires 22 are disposed in a space surrounded by the first plate part 37 and the second plates part 38 of the electrical wire holding part 36. A height dimension of both end portion 38*a* of the second plate parts 38 along a longitudinal direction of the electrical wire holding part 36 is formed higher than a height dimension of a middle part 38*b*. Obviously, the height of the second plate parts 38 from the first plate part 37 may be formed uniformly in the electrical wire holding part 36. The electrical wire holding part 36 may be formed into a flat plate shape or a curved plate shape, for example.

A banding member 80 such as a pressure-sensitive adhesive tape or a banding band, for example, is wound around the electrical wire holding part 36 and the electrical wires 22 so that the electrical wire holding part 36 keeps holding the electrical wires 22. An illustration of the banding member 80 is omitted in the drawings except for FIG. 3 and FIG. 4. Herein, the banding member 80 is wound in a position of the middle part 38*b* in the second plate parts 38 located low in height from the first plate part 37. Obviously, the position in the electrical wire holding part 36 where the banding member 80 is wound can be set to an optional position. Furthermore, the electrical wire holding part 36 may keep holding the electrical wires 22 with a member other than the banding member 80.

Herein, the electrical wire holding part 36 holds the electrical wires 22 which are not previously bundled, however, this configuration is not necessary. The plurality of electrical wires 22 may be previously bundled for each divided group to be an electrical wire bundle. In this case, the electrical wire holding part 36 holds the electrical wire bundle. That is to say, the banding member for bundling the electrical wires 22 and the banding member 80 making the electrical wire holding part 36 hold the electrical wires 22 may be separately provided.

In a state where the electrical wire holding part 36 is located around the attaching target member 10, the electrical wire holding part 36 has a ceiling wall located on an opposite side of the electrical wires 22 from the attaching target member 10. Herein, the first plate part 37 of the electrical wire holding part 36 serves as the ceiling wall. In other words, the electrical wire holding members 31, 32, 33, and 34 are attached to the attaching target member 10 so that the first plate part 37 serves as the ceiling wall. The ceiling wall reduces the electrical wires 22 spreading outward from the attaching target member 10. Accordingly, the height of the wiring member 20 from the attaching target member 10 can be reduced.

The connection parts 40 and 44 parallelly connect the electrical wire holding members 31, 32, 33, and 34. Herein, the plurality of electrical wire holding members 31, 32, 33, and 34 are sequentially connected by the connection parts 40 and 44. The plurality of electrical wire holding members 31, 32, 33, and 34 are connected to each other in order of electrical wire holding member 31, the electrical wire holding member 32, the electrical wire holding member 33, and the electrical wire holding member 34. All of the connection parts 40 and 44 connecting the electrical wire holding members 31 and 32, the connection parts 40 and 44 connecting the electrical wire holding members 32 and 33, and the connection parts 40 and 44 connecting the electrical wire holding members 33 and 34 are formed into the similar shape, however, a connection part formed into a different shape may be included.

The electrical wire holding members 31, 32, 33, and 34 are arranged along an outer periphery of the attaching target member 10. Herein, the electrical wire holding members 31, 32, 33, and 34 mutually connected are rotatable around an axis along a longitudinal direction. The electrical wire holding members 31, 32, 33, and 34 mutually connected are rotatable at least between a state of being flatly arranged and a state of being arranged along the outer periphery of the attaching target member 10. Accordingly, the electrical wire holding members 31, 32, 33, and 34 are in the state of being arranged along the outer periphery of the attaching target member 10.

At this time, as described above, in the state where the electrical wire holding part 36 is located around the attaching target member 10, the first plate part 37 of the electrical wire holding part 36 constitutes the ceiling wall located on the opposite side of the electrical wires 22 from the attaching target member 10. Accordingly, the electrical wire holding members 31, 32, 33, and 34 mutually connected are rotatable at least in a direction in which the first plate part 37 is located on an outer periphery side with respect to the electrical wires 22 from the state of being flatly arranged. Herein, the electrical wire holding members 31, 32, 33, and 34 mutually connected are also rotatable in a direction in which the first plate part 37 is located on an inter periphery side with respect to the electrical wires 22 from the state of being flatly arranged.

Herein, the connection parts 40 and 44 rotatably connect the electrical wire holding members 31, 32, 33, and 34. Specifically, the connection part 40 includes a shaft 42. The connection part 44 includes bearings 47 and 48 rotatably supporting the shaft 42. More specifically, the connection part 40 includes a pair of support plate parts 41 laterally protruding from the second plate part 38 and the shaft 42 with a column shape supported by the pair of support plate parts 41. The connection part 44 includes a pair of arms 45 and 46 laterally protruding from the second plate part 38 and the bearings 47 and 48 with a half-cylindrical shape provided on an end of each of the arms 45 and 46. The bearing 47 provided on the end of the arm 45 supports the shaft 42 from one side, the bearing 48 provided on the end of the arm 46 supports the opposite side of the shaft 42 from the bearing 47. That is to say, the bearing 47 and the bearing 48 are formed so that concave portions thereof are reversed from each other. As illustrated in FIG. 5, a cylindrical space supporting the shaft 42 by the bearing 47 and the bearing 48 in a front view is formed. A distance from a tip portion of the bearing 47 to a tip portion of the bearing 48 is smaller than a diameter of the shaft 42 in the front view. Accordingly, the shaft 42 is housed in the bearings 47 and 48 while elastically deforming the connection part 44 so that the distance from the tip portion of the bearing 47 to the tip portion of the bearing 48 increases. At this time, a side surface of each tip portion of the bearings 47 and 48 constitutes a guide surface G inclined toward the concave portion. When the shaft 42 is housed in the concave portions of the bearings 47 and 48, the shaft 42 moves along the guide surface G, thereby elastically deforming the connection part 44 easily so that the distance from the tip portion of the bearing 47 to the tip portion of the bearing 48 increases.

Herein, the connection parts 40 and 44 are provided on a lateral side of the electrical wire holding part 36. Accordingly, a protruding dimension of the connection parts 40 and 44 from the attaching target member 10 can be reduced, thus the height of the wiring member 20 from the attaching target member 10 can be reduced.

More specifically, in the electrical wire holding member 31, both the connection parts 40 and 44 are provided on one side of the electrical wire holding part 36 (right side in FIG. 4). The connection part 40 is provided on one end portion in a longitudinal direction (upper side in FIG. 4), and the connection part 44 is provided on the other end portion in the longitudinal direction (lower side in FIG. 4). In the electrical wire holding members 32 and 33, both the connection parts 40 and 44 are provided on one side of the electrical wire holding part 36 (right side in FIG. 4). The connection part 40 is provided on one end portion in a longitudinal direction (upper side in FIG. 4), and the connection part 44 is provided on the other end portion in the longitudinal direction (lower side in FIG. 4). In the electrical wire holding members 32 and 33, both the connection parts 40 and 44 are provided also on the other side of the electrical wire holding part 36 (left side in FIG. 4). The connection part 40 is provided on the other end portion in the longitudinal direction (lower side in FIG. 4), and the connection part 44 is provided on the one end portion in the longitudinal direction (upper side in FIG. 4). Thus, the electrical wire holding members 32 and 33 are formed to be symmetric with respect to a center in the plan view. In the electrical wire holding member 34, both the connection parts 40 and 44 are provided on the other side of the electrical wire holding part 36 (left side in FIG. 4). The connection part 40 is provided on the other end portion in the longitudinal direction (lower side in FIG. 4), and the connection part 44 is provided on the one end portion in the longitudinal direction (upper side in FIG. 4). Particularly herein, the connection parts 40 and 44 are provided on a lateral side of the end portions 38*a* where a height of each of the second plate parts 38 is high.

In a state where the electrical wire holding members 31 and 32 are connected to each other, the shaft 42 of the electrical wire holding member 31 and the shaft 42 of the electrical wire holding member 32 serving for the connection of the electrical wire holding members 31 and 32 have the same rotation axis. Accordingly, the electrical wire holding members 31 and 32 are rotatably connected to each other. The same applies to the electrical wire holding members 32 and 33 and the electrical wire holding members 33 and 34.

The base attaching parts 50 and 51 are attached to attached parts 66 and 67 formed on the base 60. The base attaching parts 50 and 51 are parts for attaching the electrical wire holding members 31, 32, 33, and 34 to the base 60. As described above, the base attaching parts 50 and 51 are formed on the electrical wire holding members 31 and 34.

In the electrical wire holding member 31, the two base attaching parts 50 are formed on the other side of the electrical wire holding part 36 (the opposite side of the electrical wire holding part 36 from the connection parts 40 and 44). The two base attaching parts 50 are formed into the same shape. The two base attaching parts 50 are provided in the same positions as those of the connection parts 40 and 44 along the longitudinal direction of the electrical wire holding part 36. Accordingly, the two base attaching parts 50 are provided in the position exactly opposite to the connection parts 40 and 44 with respect to the electrical wire holding part 36.

In the electrical wire holding member 34, the two base attaching parts 51 are formed on the one side of the electrical wire holding part 36 (the opposite side of the electrical wire holding part 36 from the connection parts 40 and 44). The two base attaching parts 51 are formed into the same shape. The two base attaching parts 51 are provided in the same positions as those of the connection parts 40 and 44 along the longitudinal direction of the electrical wire holding part 36. Accordingly, the two base attaching parts 51 are provided in the position exactly opposite to the connection parts 40 and 44 with respect to the electrical wire holding part 36. The shapes of the base attaching parts 50 and 51 are described hereinafter together with the shapes of the attached parts 66 and 67.

A rib 52 is formed on an outer periphery of the electrical wire holding part 36 in the electrical wire holding members 31, 32, 33, and 34. The rib 52 is formed on a part of the electrical wire holding part 36 where the connection parts 40 and 44 and the base attaching parts 50 and 51 are provided along the longitudinal direction. The two ribs 52 are provided separately on one end portion of the electrical wire holding part 36 along the longitudinal direction. The two ribs 52 on one end portion of the electrical wire holding part 36 are provided to sandwich the connection parts 40 and 44 and the base attaching parts 50 and 51. The ribs 52 are provided, thus the electrical wire holding part 36 hardly bows in attaching the connection parts 40 and 44 and the base attaching parts 50 and 51, for example, and an attaching operation can be easily performed.

The base 60 is a member attached to the attaching target member 10 in a state of surrounding at least a part of a periphery of the attaching target member 10. The electrical wire holding members 31, 32, 33, and 34 are attached to the outer periphery side of the base 60.

The base 60 is formed into a partially-cylindrical shape constituting a part of a cylinder. The base 60 is a partial cylinder exceeding a half cylinder. The base 60 can be a member integrally formed by a resin, for example. A curvature radius of an inner periphery surface of the base 60 coincides with a curvature radius of an outer peripheral surface of the attaching target member 10.

Both sides of both end portions 61 in an extension direction of the base 60 are separated via a slit 63 in a circumferential direction with respect to a middle part 62 in an extension direction of the base 60. Accordingly, a pair of elastic deformation pieces 64 at the both sides of the both end portions 61 in the extension direction of the base 60 can be elastically deformed in an inward-outward direction of the base 60.

Locking claws 65 protruding inward are formed on tip portions of the pair of elastic deformation pieces 64 provided on the both end portions 61 of the base 60. The fixing holes 12 to which the pair of locking claws 65 are fitted are formed in parts of the attaching target member 10 corresponding to the pair of locking claws 65.

When the base 60 is set to cover around the attaching target member 10, the pair of elastic deformation pieces 64 of the both end portions 61 of the base 60 are elastically deformed outward, and when each locking claw 65 is fit into the fixing hole 12, each elastic deformation piece 64 reverts to the original shape. Accordingly, each locking claw 65 is kept in a state of being fitted into the fixing hole 12, thus the base 60 is kept in a state of being fixed to the attaching target member 10. In this state, the configuration of fitting the locking claws 65 into the corresponding pair of fixing holes 12 prevents the base 60 from rotating around the attaching target member 10 and deviating in the extension direction of the attaching target member 10.

The structure of attaching the base 60 to the attaching target member 10 is not limited to the example described above. For example, also applicable is a configuration that the locking claw 65 described above is omitted, and the base 60 formed into a partial cylinder exceeding a half cylinder covers more than the half of the periphery of the attaching target member 10, thus the base 60 is kept in a state of not getting out of the attaching target member 10. Also applicable in this case is that at least one protruding part is formed on an inner peripheral part of the base 60 and fitted into a hole formed in the attaching target member 10 to suppress the deviation of the base 60. Also applicable is a configuration that a protrusion formed on the base 60 is pressed into a hole formed in a fixing target member, thus the base 60 is attached to the fixing target member. The base 60 may be fixed to a fixing target member only by a structure of fitting a protrusion for preventing the base 60 from getting out of the fixing target member into a hole formed in the attaching target member 10. Also applicable is a configuration that the base 60 is formed into a cylinder shape covering a whole periphery of the attaching target member 10 and a hinge part enabling an opening and closing of the base 60 is provided halfway through the base 60 in the circumferential direction. Also applicable in this case is a configuration that a locking part and a locked part mutually locked are provided on tip portions of two parts connecting via the hinge part, and the locking part and the locked part are locked to each other in a state where the base 60 is attached to the periphery of the attaching target member 10 so that the base 60 is attached to the attaching target member 10. Also applicable in this case is that at least one protruding part is formed on an inner peripheral part of the base 60 and fitted into a hole formed in the attaching target member 10 to suppress the deviation of the base 60.

The attached parts 66 and 67 are formed on the base 60. The base 60 is integrally molded with the attached parts 66 and 67. The attached parts 66 and 67 are provided in one end portion and the other end portion one by one in the circumferential direction in the both end portions of the base 60 along the longitudinal direction of the middle part 62 in the extension direction of the base 60. Herein, the middle part 62 in the extension direction of the base 60 includes a half cylinder part 62*a* and an extension piece 62*b* extending in a tangential direction from an end portion of the half cylinder part 62 in a circumferential direction. The attached parts 66 and 67 are provided to protrude from an outer surface of the extension piece 62*b*.

Herein, the two attached parts 66 are provided on one end portion in the circumferential direction of the middle part 62 in the extension direction of the base 60, and the two attached parts 67 are provided on the other end portion in the circumferential direction. The two attached parts 66 are formed into the same shape and separately provided in the extension direction of the base 60. In the similar manner, the two attached parts 67 are formed into the same shape and separately provided in the extension direction of the base 60. The attached part 66 and the attached part 67 are formed into shapes different from each other. The base attaching part 50 is attached to the attached part 66 and the base attaching part 51 is attached to the attached part 67.

The base attaching part 51 and the attached part 66 serve as a so-called male locking piece M and the base attaching part 50 and the attached part 67 serve as a so-called female locking-receiving part F.

The locking piece M includes a protruding piece M1 formed on a plate-like piece protruding outward from an outer peripheral surface of the electrical wire holding part 36 or base 60 and a locking protruding part M2 provided on a tip portion of the protruding piece M1. The tip portion of each protruding piece M1 is formed into a shape gradually narrowing toward a tip portion side. The locking protruding part M2 is formed on one main surface of the tip portion of each protruding piece M1. The locking protruding part M2 is formed into a shape in which a protruding dimension gradually increases from the tip portion toward a base end portion of the protruding piece M1. A surface of the locking protruding part M2 facing a base end portion side of the protruding piece M1 is formed on a surface orthogonal to a protruding direction of the protruding piece M1.

The locking-receiving part F includes a flat-square cylindrical frame part F1 in which a through hole FH, into which the locking piece M is inserted, is formed and a locking convex portion F2 locked to the locking protruding part M2 provided on the frame part F1 and passing through the frame F1. The locking convex portion F2 protrudes from an outer periphery side on an exit side of the through hole FH in one piece of the frame part F1 to an inner periphery side thereof to cover a part of the through hole FH. A surface of the locking convex portion F2 facing the exit side of the through hole FH is formed on a surface orthogonal to an axial direction of the through hole FH. For example, the locking convex portion F2 can be elastically deformed to get away from the through hole FH when the locking protruding part M2 is inserted and can elastically revert after the locking protruding part M2 is pulled out. Accordingly, the locking protruding part M2 can pass through the through hole FH and can be locked to the locking convex portion F2 after passing through the through hole FH.

Described above as the example is that the plurality of attached parts 66 and 67 are provided on the base 60, and the plurality of base attaching parts 50 and 51 are provided on the electrical wire holding member 31 and 34, however, also applicable is a configuration that one attached part is provided on a side of the base 60, and one base attaching part is provided on a side of the electrical wire holding members 31, 32, 33, and 34. The example of the attached parts 66 and 67 inserted into and held by the base attaching parts 50 and 51 in a state of not getting out of the base attaching parts 50 and 51 is limited to the example described above, but various kinds of retaining configuration can be adopted. Described above as the example is that both the locking piece M and the locking-receiving part F are provided on the attached part of the base and the base attaching part of the electrical wire holding member, however, also applicable is a configuration that only the locking piece M or the locking-receiving part F is provided on the attached part of the base, and only the locking-receiving part F or the locking piece M is provided on the base attaching part of the electrical wire holding member. Even in the case where both the locking piece M and the locking-receiving part F are provided on the attached part of the base and the base attaching part of the electrical wire holding member, the locking piece M and the locking-receiving part F may be provided in positions point-symmetric with each other on the base 60. That is to say, also applicable is a configuration that in one end portion of the base 60 in the longitudinal direction, the locking piece M is provided on one end portion in the circumferential direction and the locking-receiving part F is provided on the other end portion, and in the other end portion of the base 60 in the longitudinal direction, the locking-receiving part F is provided on one end portion in the circumferential direction and the locking piece M is provided on the other end portion.

Described above as the example is that the base attaching parts 50 and 51 are provided only on the electrical wire holding members 31 and 34 which are located in both end portions in the three or more electrical wire holding members 31, 32, 33, and 34 arranged and mutually connected along the outer periphery of the base 60, however, this configuration is not necessary. Also applicable is a configuration that the base attaching parts 50 and 51 are also provided on the electrical wire holding members 32 and 33 which are located in a middle portion in the three or more electrical wire holding members 31, 32, 33, and 34 arranged and mutually connected along the outer periphery of the base 60 or a configuration that the base attaching parts 50 and 51 are provided only on the electrical wire holding members 32 and 33 which are located in the middle portion in the three or more electrical wire holding members 31, 32, 33, and 34 arranged and mutually connected along the outer periphery of the base 60.

<Assembly of Wiring Member>

The wiring member 20 is assembled as follows, for example.

That is to say, firstly, the electrical wires 22 is held by the electrical wire holding members 31, 32, 33, and 34 which have not been connected yet. As described above, for example, the banding member 80 is wound around the electrical wire holding part 36 on which the electrical wires 22 are disposed, thus the electrical wire holding members 31, 32, 33, and 34 can be made to hold the electrical wires 22.

Subsequently, the electrical wire holding members 31, 32, 33, and 34 are connected by the connection parts 40 and 44. Then, the electrical wire holding members 31, 32, 33, and 34 connected to each other are attached to the base 60. For example, as illustrated in FIG. 6, the electrical wire holding members 31, 32, 33, and 34 are rotated after the base attaching part 51 of the electrical wire holding member 34 located on one end side in a parallel direction is attached to the attached part 67 of the base 60, and the base attaching part 50 of the electrical wire holding member 31 located on the other end side in the parallel direction is attached to the attached part 66 of the base 60. The plurality of electrical wire holding members 31, 32, 33, and 34 are thereby attached to the base 60 and arranged on the outer periphery of the base 60 so that they can be disposed along the outer periphery of the attaching target member 10.

<Installation on Vehicle>

The wiring member 20 is assembled as described above, for example, and transported to a vehicle assembly plant. The supporting member 30 in the wiring member 20 is fixed to the attaching target member 10 in the vehicle assembly plant. Accordingly, the electrical wires 22 are supported along the attaching target member 10, and the support structure 1 of the wiring member is formed. It is also applicable that the electrical wires 22 and the supporting member 30 are separately transported to the vehicle assembly plant and assembled into the wiring member 20 in which the supporting member 30 is attached to the electrical wires 22, and the supporting member 30 is fixed to the attaching target member 10 in the vehicle assembly plant.

Herein assumed is a case where peripheral components 100, 102, and 104 are located on an upper side and both sides of the attaching target member 10 in a vehicle, for example, as illustrated in FIG. 2. Assumed as the peripheral components 100, 102, and 104 are an interior panel (such as a dash panel) of a vehicle, an electrical device, and a duct component for an air conditioner, for example.

In this case, when all of the electrical wires 22 are bundled together, the electrical wires 22 are formed into a relative thick bundle as an electrical wire bundle Wb1 illustrated in FIG. 2. Thus, it is hard to place the electrical wire bundle Wb1 in any space around the attaching target member 10.

Thus, the electrical wires 22 are divided into a plurality of (four herein) groups and held by the electrical wire holding part 36 for each group. Accordingly, the plurality of electrical wires 22 can be dispersedly held by the attaching target member 10, thus even in a case there are a narrow space around the attaching target member 10, many electrical wires 22 can be disposed compared with a case where the plurality of electrical wires 22 are bundled together.

According to the present embodiment, at this time, the plurality of electrical wire holding members 31, 32, 33, and 34 in the supporting member 30 can separately hold the plurality of electrical wires 22. The supporting member 30 is attached to the attaching target member 10, thus the plurality of electrical wires 22 can be separately attached to the attaching target member 10. At this time, the electrical wire holding members 31, 32, 33, and 34 can be connected to each other by the connection parts 40 and 44, thus the supporting member 30 and the wiring member 20 holding the electrical wires 22 can be arranged as one member. The plurality of electrical wire holding members 31, 32, 33, and 34 are provided, thus the number of electrical wire holding parts 36 can be easily adjusted by changing the number of electrical wire holding members 31, 32, 33, and 34.

The ceiling wall located on the opposite side of the electrical wires 22 from the attaching target member 10 reduces the electrical wires 22 spreading outward from the attaching target member 10. Accordingly, the height of the wiring member 20 from the attaching target member 10 can be reduced.

The connected the electrical wire holding members 31, 32, 33, and 34 are rotatable at least between a state of being flatly arranged and a state of being arranged along the outer periphery of the attaching target member 10, thus even when the plurality of electrical wire holding members 31, 32, 33, and 34 are connected, they can be arranged along the outer periphery of the attaching target member 10. Accordingly, the height of the wiring member 20 from the attaching target member 10 can be further reduced. After the operation of making the plurality of electrical wire holding members 31, 32, 33, and 34 hold the electrical wires 22 in the state where the plurality of electrical wire holding members 31, 32, 33, and 34 are flatly arranged, the plurality of electrical wire holding members 31, 32, 33, and 34 can be rotated to surround the periphery of the attaching target member 10. Accordingly, the operation of making the plurality of electrical wire holding parts 36 hold the electrical wires 22 can be easily performed.

One side of the electrical wire holding members 31, 32, 33, and 34 mutually connected includes the shaft 42 as the connection part 40, and the other side thereof includes the bearings 47 and 48 rotatably supporting the shaft 42 as the connection part 44, thus the electrical wire holding members 31, 32, 33, and 34 are rotatable at the connection parts 40 and 44.

The plurality of electrical wire holding members 31, 32, 33, and 34 are attached to the base 60, thereby being kept in the state of being arranged along the periphery of the attaching target member 10. The base 60 on the supporting member 30 in the above state is attached to the attaching target member 10, thus the plurality of electrical wire holding members 31, 32, 33, and 34 are collectively arranged along the periphery of the attaching target member 10. Accordingly, the wiring member 20 can be easily attached to the attaching target member 10.

The base attaching parts 50 and 51 are provided only on the electrical wire holding members 31 and 34 located in both end portions in the three or more electrical wire holding members 31, 32, 33, and 34, thus the electrical wire holding members 32 and 33 located in the middle portion need not be provided with the base attaching parts 50 and 51.

Modification Example

FIG. 7 is a perspective view illustrating a first modification example of a connection structure of the electrical wire holding members.

When the connected electrical wire holding members are rotatable, it is also considered that a rotation amount control part 54 controlling a rotation amount of the connected electrical wire holding members is provided. FIG. 7 illustrates an example of the rotation amount control part 54.

Specifically, in the example illustrated in FIG. 7, a connection part 140 includes a shaft 142, and a connection part 144 includes a bearing 149. The shaft 142 is formed to protrude from a support plate part 141, and the bearing 149 has a hole form in a plate-like piece 149*a*. Accordingly, the electrical wire holding members connected by the connection parts 140 and 144 are rotatable.

In the example illustrated in FIG. 7, the rotation amount control part 54 includes a protruding part 55 and a circumferential groove 56 in which the protruding part 55 is fitted. The protruding part 55 is formed to protrude from the support plate part 141. The circumferential groove 56 has a groove form in the plate-like piece 149*a*. The circumferential groove 56 is formed to extend to have an arc shape centering on the bearing 149. The protruding part 55 can move along the circumferential groove 56 while being fitted in the circumferential groove 56.

Accordingly, in the example illustrated in FIG. 7, when the electrical wire holding member provided with the support plate part 141 and the electrical wire holding member provided with the plate-like piece 149*a* rotate around the shaft 142, the protruding part 55 moves along the circumferential groove 56, and the protruding part 55 comes in contact with an end portion of the circumferential groove 56, thus the further rotation is suppressed.

In this manner, when the rotation amount between the two electrical wire holding members is controlled, it is considered that a rotation to one side (a rotation of the first plate part 37 in a direction toward the outer periphery side with respect to the electrical wires 22) is controlled in a range from 30 degrees to 90 degrees, for example. At this time, a value of controlling the rotation to the one side may be set to a value equal to or larger than an angle of the electrical wire holding member arranged along the outer periphery of the attaching target member 10. Specifically, in the example illustrated in FIG. 1, the electrical wire holding members 31, 32, 33, and 34 arranged along the outer periphery of the attaching target member 10 rotate 55 degrees from the flat state to the one side. Accordingly, when the rotation amount control part 54 is applied to the example illustrated in FIG. 1, the rotation to the one side may be set to an optional angle equal to or larger than 55 degrees.

It is considered that a rotation to the other side (a rotation of the first plate part 37 in a direction toward the inner periphery side with respect to the electrical wires 22) is controlled to 0 degree, for example, that is to say, the electrical wire holding members are controlled so that they are flatly arranged. It is considered that the rotation to the other side is controlled so that a rotation amount thereof is smaller than that of the rotation to the one side, for example. The rotation to the other side may be set to be smaller than the angle of the electrical wire holding members arranged along the outer periphery of the attaching target member 10, for example. For example, in the example illustrated in FIG. 1, the electrical wire holding members 31, 32, 33, and 34 arranged along the outer periphery of the attaching target member 10 rotate 55 degrees from the flat state to the one side. Accordingly, when the rotation amount control part 54 is applied to the example illustrated in FIG. 1, the rotation to the other side may be set to an optional angle smaller than 55 degrees. Accordingly, it is possible to suppress an attachment of the electrical wire holding members, in the state of erroneously rotating to the other side, to the attaching target member 10.

When the rotation amount control part 54 is provided in this manner, an excess rotation of the electrical wire holding members can be suppressed. The electrical wire holding member including the rotation amount control part 54 is a molded component integrally molded, using a resin, for example, to include the electrical wire holding part, the connection part, and the rotation amount control part 54.

Described above as the example of the rotation amount control part 54 are the protruding part 55 and the circumferential groove 56 in which the protruding part 55 is fitted, however, also obviously applicable as the rotation amount control part 54 is the other configuration that a part of one member and a part of the other member which mutually rotate interfere with each other, for example.

FIG. 8 is a front view illustrating a second modification example of a connection structure of the electrical wire holding members.

In the above description, the electrical wire holding members are rotatably connected by the connection part including the shaft and the connection part including the bearing, however, this configuration is not necessary. As illustrated in FIG. 8, a rotatable configuration may be adopted separately from the connection parts.

In the example illustrated in FIG. 8, electrical wire holding members 231 and 233 include the electrical wire holding part 26 and connection parts 240 and 344. The connection part 240 is provided on an opposite side of the electrical wire holding part 36 from the connection part 244. The connection part 240 can be connected to the connection part 244 provided on the other electrical wire holding member. The connection parts 240 and 244 are connected to each other in a non-rotatable manner. For example, the connection part 240 includes a locked part 241 in which a hole 241*h* is formed. The connection part 244 includes a locking part 245 having a column 245*a* passing through the hole 241*h* and a locking protrusion 245*b* locked to a peripheral edge part of the hole 241*h*. At this time, the locked part 241 includes a plate-like part 241*b* protruding from a plate-like part 241*a*, in which the hole 241*h* is formed, and extending in parallel with the column 245*a*. If such connection parts 240 and 244 rotate, the plate-like part 241*b* and the column 245*a* interfere with each other, and the rotation is suppressed. Alternatively, it is also applicable that in the connection structure using the shaft and the bearing described above, in a state where the two electrical wire holding members are connected to each other, the shaft of one electrical wire holding member serving for the connection of the electrical wire holding members and the shaft of the other electrical wire holding member have different rotation axes, thereby suppressing the rotation at the connection part between the two electrical wire holding members.

Each of the electrical wire holding members 231 and 232 further includes a hinge part 258. The hinge part 258 intervenes between the connection part 244 and the electrical wire holding part 36. The hinge part 258 rotatably connects the connection part 244 and the electrical wire holding part 36. Accordingly, each of the electrical wire holding members 231 and 232 has a part rotatably formed alone. For example, the hinge part 258 is formed into a thin-walled shape, thereby rotatably connecting the connection part 244 and the electrical wire holding part 36.

Each of the electrical wire holding members 231 and 232 is a molded component integrally molded, using a resin, for example, to include the electrical wire holding part 36, the connection parts 240 and 244, and the hinge part 258.

When such a connection structure is provided, the electrical wire holding members 231 and 232 are rotatable at the hinge part 258 provided separately from the connection parts 240 and 244.

In the example illustrated in FIG. 8, both the two electrical wire holding members 231 and 232 which are mutually connected includes the hinge part 258, however, this configuration is not necessary. It is applicable at least one of the two electrical wire holding members 231 and 232 which are mutually connected includes the hinge part 258.

Figure 9:
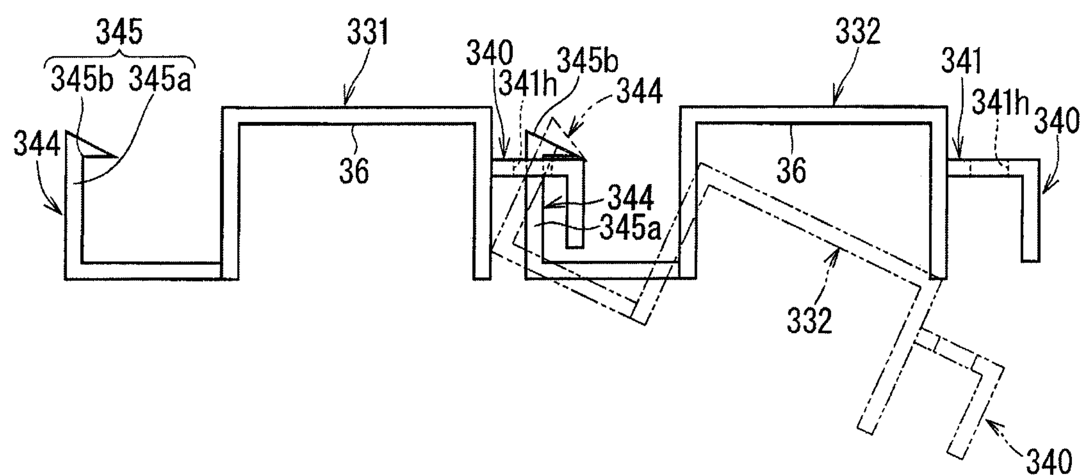
FIG. 9 A front view illustrating a third modification example of a connection structure of the electrical wire holding members.

FIG. 9 is a front view illustrating a third modification example of a connection structure of the electrical wire holding members.

Described above as the configuration of being rotatable at the connection part is the example of the connection structure of the connection part including the shaft and the connection part including the bearing, however, this configuration is not necessary. A configuration of connection parts 340 and 344 illustrated in FIG. 9 may be adopted as the configuration of being rotatable at the connection part.

In the example illustrated in FIG. 9, electrical wire holding members 331 and 333 include the electrical wire holding part 36 and connection parts 340 and 344. The connection part 340 is provided on an opposite side of the connection part 340 with respect to the electrical wire holding part 36. The connection part 340 can be connected to the connection part 344 provided on the other electrical wire holding member.

The connection part 340 includes a locked part 341 in which a hole 341*h* is formed. The connection part 344 includes a locking part 345 having a column 345*a* passing through the hole 341*h* and a locking protrusion 345*b* locked to a peripheral edge part of the hole 341*h*. At this time, the hole 341*h* is formed to be sufficiently larger than the column 345*a*, and the electrical wire holding members 331 and 332 are rotatably connected to each other.

The present configuration also enables the rotation of the two electrical wire holding members 331 and 332 at the connection parts 340 and 344.

Figure 10:
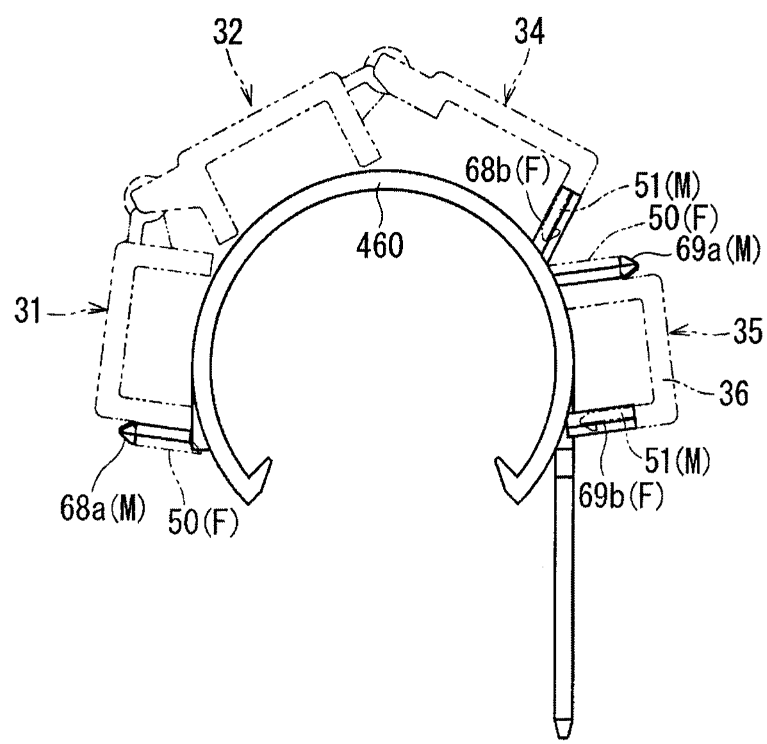
FIG. 10 A front view illustrating a modification example of an attachment structure of the base and the electrical wire holding members.

FIG. 10 is a front view illustrating a modification example of an attachment structure of the base and the electrical wire holding members.

First attached parts 68*a* and 68*b* and second attached parts 69*a* and 69*b* are formed as attached parts on a base 460.

The electrical wire holding members 31, 32, and 34 holding the electrical wires 22, which are provided in common, are attached to the first attached parts 68*a* and 68*b*. The female locking-receiving part F which can be locked to the male locking piece M as the base attaching part 50 of the electrical wire holding member 31 is formed as the first attached part 68*a*, and the male locking piece M which can be locked to the female locking-receiving part F as the base attaching part 51 of the electrical wire holding member 33 is formed as the first attached part 68*b*. Then, the electrical wire holding members 31, 32, and 34 connected to each other are attached to the base 460 using the first attached parts 68*a* and 68*b*.

The electrical wire holding member 35 holding the electrical wires 22, which are optionally provided, are attached to the second attached parts 69*a* and 69*b*. The male locking piece M is formed as the second attached part 69*a*, and the female locking-receiving part F is formed as the second attached part 69*a*. Then, the electrical wire holding member 35 is attached to the base 460 using the second attached parts 69*a* and 69*b*. The electrical wire holding member 35 is formed into a shape in which the male locking piece M and the female locking-receiving part F are provided as the base attaching parts 50 and 51 on both sides of the electrical wire holding part 36. The female locking-receiving part F of the electrical wire holding member 35 is locked to the male locking piece M of the second attached part 69, and the male locking piece M of the electrical wire holding member 35 is locked to the female locking-receiving part F of the second attached part 69.

The electrical wires 22 provided in common and the electrical wires 22 optionally provided can be easily supported separately in this manner. Accordingly, the present configuration can easily correspond to a design change, for example.

The present example describes a configuration that the three electrical holding members 31, 32, and 34 holding the electrical wires 22 provided in common and one electrical wire holding member 35 holding the electrical wires 22 optionally provided are attached to the base 460, however, this configuration is not necessary. The number of electrical wire holding members holding the electrical wires 22 provided in common and the number of electrical wire holding members holding the electrical wires 22 optionally provided are not particularly limited, but can be set to optional numbers. For example, the number of electrical wire holding members holding the electrical wires 22 provided in common may be the same as or larger or smaller than the number of electrical wire holding members holding the electrical wires 22 optionally provided. The electrical wire holding members holding the electrical wires 22 provided in common are connected to each other, but may not be connected to each other. The electrical wire holding member holding the electrical wires 22 optionally provided is not connected to the other electrical wire holding member, but may be connected to the other electrical wire holding member.

Other Modification Example

In the above description, the electrical wire holding member is attached to the attaching target member so that a first wall part serves as the ceiling wall, however, this configuration is not necessary. The electrical wire holding member may be attached to the attaching target member so that the first wall part intervenes between the electrical wires and the attaching target member.

In the above description, the connected electrical wire holding members are rotatable, however, this configuration is not necessary. The connected electrical wire holding members may not be rotated. In this case, the plurality of electrical wire holding members may be connected to be arranged along the outer periphery of the attaching target member 10, or may be flatly arranged.

That is to say, the plurality of electrical wire holding members in the supporting member may be parallelly connected by the connection parts so that the electrical wires to be held by the electrical wire holding parts are parallel to each other.

In the above description, one electrical wire holding member is provided with one electrical wire holding part, however, this configuration is not necessary. One electrical wire holding member may be provided with the plurality of electrical wire holding parts. At this time, the electrical wire holding members having a different number of electrical wire holding parts may be mutually connected.

In the above description, the electrical wire holding members are connected only by the connection part integrally formed with the electrical wire holding part 36, however, this configuration is not necessary. The other member such as a screw, for example, may be used for connecting the electrical wire holding members, instead of the connection part. In this case, a part of a base to be screwed in the electrical wire holding member serves as the connection part integrally formed with the electrical wire holding part.

In the embodiment described above, the four electrical wire holding members 31, 32, 33, and 34 are connected, however, this configuration is not necessary. The number of connected electrical wire holding members may be appropriately set, thus two, three, or five or more electrical wire holding members may be connected.

In the embodiment described above, when two or more electrical wire holding members are connected, both the electrical wire holding members 31 and 34 are used, however, this configuration is not necessary. Two electrical wire holding members, both of which are one type among the electrical wire holding members 31 and 34, may be used as the electrical wire holding member located on the both ends. Accordingly, when the two electrical wire holding members are connected, the electrical wire holding member 31 and the electrical wire holding member 34 may be connected, the two electrical wire holding members 31 may be connected, or the two electrical wire holding members 34 may be connected. When the three or more electrical wire holding members are connected, one electrical wire holding member 31, one electrical wire holding member 34, and one or more electrical wire holding members 32 may be connected, two electrical wire holding members 31 and one or more electrical wire holding members 32 may be connected, or two electrical wire holding members 34 and one or more electrical wire holding members 32 may be connected.

In the above description, the base 60 is included, however, this configuration is not necessary. Also considered is that the base 60 is omitted. Considered in this case is that the electrical wire holding member is directly attached to the outer periphery of the attaching target member 10 by a banding member such as a pressure-sensitive adhesive tape or a banding band.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS

1 support structure of wiring member
10 attaching target member
20 wiring member
22 electrical wire
30 supporting member
31, 32, 33, 34, 35 electrical wire holding member
36 electrical wire holding part
23 first plate part (ceiling wall)
40 connection part
42 shaft
44 connection part
47, 48, 149 bearing
50, 51 base attaching part
54 rotation amount control part
258 hinge part
60 base
66, 67 attached part
68*a*, 68*b* first attached part
69*a*, 69*b* second attached part

The invention claimed is:

1. A supporting member for attaching a plurality of electrical wires to an attaching target member, comprising a plurality of electrical wire holding members each including an electrical wire holding part which can hold at least a part of an electrical wire, the electrical wire holding part has a gutter shape defined by a first plate and second plates, the second plates being provided, respectively, at opposing sides of the first plate, and a connection part integrally formed with the electrical wire holding part at a based end side of the electrical wire holding part that is defined by an intersection of the first plate and the second plates, wherein the connection part protrudes in a direction perpendicular to the second plates, wherein the plurality of electrical wire holding members are parallelly connected by the connection part so that the plurality of electrical wires to be held by the electrical wire holding parts are parallel to each other, and wherein the plurality of electric wire holding members are mutually connected and are rotatable at least between a state of being flatly arranged and a state of being arranged to surround the outer periphery of the attaching target member.

2. The supporting member according to claim 1, wherein a first electrical wire holding member in the plurality of electric wire holding members has a shaft as the connection part, and a second electrical wire holding member in the plurality of electric wire holding members has a bearing rotatably supporting the shaft as the connection part.

3. The supporting member according to claim 1, wherein at least one of a first and second electrical wire holding member in the plurality of electric wire holding members further includes a hinge part integrally formed with the connection part and the electrical wire holding part so as to intervene between the connection part and the electrical wire holding part and rotatably connecting the connection part and the electrical wire holding part.

4. The supporting member according to claim 1, wherein a first electrical wire holding member in the plurality of electric wire holding members includes a locked part in which a hole is formed as the connection part, a second electrical wire holding member in the plurality of electric wire holding members includes a locking part having a column passing through the hole and a locking piece locked to a peripheral edge part of the hole as the connection part, and the hole is formed larger than the column, thus the first and second electrical wire holding members are rotatably connected.

5. The supporting member according to claim 1, wherein a rotation amount control part controlling a rotation amount of a first and a second electrical wire holding member in the plurality of electric wire holding members is provided.

6. The supporting member according to claim 1, further comprising a base attached to the attaching target member in a state of surrounding at least a part of a periphery of the attaching target member and having an outer periphery to which each of the electrical wire holding members is attached, wherein at least one of the plurality of electrical wire holding members further includes a base attaching part attached to an attached part formed on the base.

7. The supporting member according to claim 6, wherein three or more of the plurality of electrical wire holding members are connected and arranged along an outer periphery of the base, and the base attaching part is provided only on electrical wire holding members located on both ends of the three or more of the plurality of electrical wire holding members which are connected.

8. The supporting member according to claim 6, wherein the base includes, as the attached part, a first attached part to which each of the plurality of electrical wire holding members holding electrical wires provided in common is attached and a second attached part to which each of the plurality of electrical wire holding members holding electrical wires optionally provided is attached.

9. A wiring member, comprising:

the supporting member according to claim 1; and a plurality of electrical wires separately held by the plurality of electrical wire holding members.

* * * * *